US006658263B1

(12) United States Patent
Ke et al.

(10) Patent No.: US 6,658,263 B1
(45) Date of Patent: Dec. 2, 2003

(54) WIRELESS SYSTEM COMBINING ARRANGEMENT AND METHOD THEREOF

(75) Inventors: Meng-Kun Ke, Pine Brook, NJ (US); Stephen D. Kitko, Newton, NJ (US); L. C. Upadhyayula, Morris Plains, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/853,075

(22) Filed: Dec. 21, 1999

(51) Int. Cl.[7] .............................. H04Q 7/20; H01P 5/12

(52) U.S. Cl. ....................... 455/524; 455/562; 455/448; 333/126; 333/129

(58) Field of Search ................................ 455/524, 525, 455/561, 562, 448, 19, 63, 78, 83, 552, 553; 370/278, 339; 333/101, 126, 129, 132, 134; 343/820, 702

(56) References Cited

U.S. PATENT DOCUMENTS

| | | | | | |
|---|---|---|---|---|---|
| 5,023,866 | A | * | 6/1991 | De Muro | 333/126 |
| 5,386,203 | A | * | 1/1995 | Ishihara | 333/129 |
| 5,732,076 | A | * | 3/1998 | Ketseoglou et al. | 370/347 |
| 5,752,198 | A | * | 5/1998 | Frichtel et al. | 455/524 |
| 5,854,986 | A | * | 12/1998 | Dorren et al. | 455/562 |
| 5,963,180 | A | * | 10/1999 | Leisten | 333/126 |

FOREIGN PATENT DOCUMENTS

| | | | |
|---|---|---|---|
| JP | 9-238090 | 9/1997 | H04B/1/50 |
| JP | 10-93473 | 4/1998 | H04B/1/44 |
| JP | 10-200442 | 7/1998 | H04B/1/40 |

* cited by examiner

*Primary Examiner*—Dwayne Bost
*Assistant Examiner*—Erika A. Gary

(57) ABSTRACT

A system and method effectively combines communications of the base stations of multiple wireless systems on the same antenna structure. In one implementation, a wireless system combiner serves as an interface between base stations of first and second wireless systems ("first base station" and "second base station") and a shared antenna to substantially eliminate spurious noise from the first base station at frequencies allocated to the second base station and prevent transmit power from the first base station from feeding into the reception circuitry of the second base station in a shared antenna configuration. The combiner includes a first combiner filter between a duplexer of the first base station and a common connection point and a second combiner filter between a duplexer of the second base station and the common connection point. The first combiner filter filters out spurious noise generated by first base station transmitter at frequencies outside the frequency band allocated to the first base station, for example using a high Q value band-pass or band-reject filter. The second combiner filters out signal power at frequencies outside the second base station receive band to prevent transmit signal power of the first base station from feeding into the second base station's receiver circuitry, thereby preventing intermodulation.

12 Claims, 4 Drawing Sheets

WIRELESS SYSTEM COMBINING ARRANGEMENT AND METHOD THEREOF

BACKGROUND OF THE INVENTION

1. Field of the Invention

The present invention relates to the field of wireless communications.

2. Description of Related Art

Wireless networks typically rely on relatively short-range transmitter/receiver ("transceiver") base stations, each connected to a switching center, to serve mobile subscriber terminals in small regions ("cells") of a larger service area. By dividing a service area into small cells with limited-range transceivers, the same frequencies can be reused in different regions of the service area, and mobile terminals which consume relatively little power can be used to communicate with a serving base station. Service providers of such wireless networks incur substantial costs to establish the dense pattern of base stations needed to ensure adequate service, including the cost of buying/leasing the property on which base stations and switching centers are located, the cost of licensing the frequency bandwidth used for air-interface channels, and hardware/software costs associated with each base station, switching center, and landline connections between switching centers and base stations.

A significant percentage of the cost for a single base station is the cost of the antenna structure used to transmit/receive radio frequency (RF) signals to/from wireless subscriber terminals. The specific antenna structure used depends on various factors, such as cell radius (e.g., requiring a high-gain antenna structure), whether the cell is sectorized (e.g., a number of directional antennas may be used for a sectorized cell while an omni-directional antenna may be used for a non-sectorized cell), and whether diversity reception is implemented.

For many geographic regions, particularly metropolitan regions, consumer demand for wireless services can support several coexisting wireless systems, each allocated a different block of frequency spectrum. Such coexisting wireless systems will typically have independent network infrastructures and use separate antennas which provide mutual isolation. Because each base station must filter out frequencies which are not in their allocated transmit/receive bands and because transmit amplifier specifications set limits on acceptable spurious noise levels, for example to comply with FCC (Federal Communications Commission) regulations, communications from base stations/mobile subscriber terminals of first and second wireless systems will typically not interfere with each other when using separate antennas.

In rural regions, and for marginally competitive service providers, infrastructure costs may preclude establishing or expanding wireless network service in a given geographic area because of a limited number of subscribers. To address the substantial costs required to establish a wireless network, and thereby improve a service provider's ability to establish/expand their network service area, it has been proposed to share antenna structures between multiple service provider base stations, recognizing that base stations of different wireless systems will transmit/receive on different RF frequencies.

Despite the filtering circuitry of individual base stations (e.g., using a duplexer arrangement having a first band pass filter which passes frequencies in the transmit band and a second band pass filter which passes frequencies in the receive band) and transmit amplifier specifications which limit acceptable spurious noise levels at frequencies outside the allocated block of spectrum, the frequency bandwidths allocated to different wireless systems may be near enough that the conventionally-implemented filtering performed by each base station will be insufficient to prevent interference between the communication signals of each wireless system in a shared antenna environment. Additionally, the physical connection of transmission lines from multiple base stations at a common connection point will generally cause considerable power loss ("insertion loss"), as much as 50% loss, attributable to the transmit/receive signal of one system feeding into the transmission line of the second system. Such insertion loss will require increased power and/or a higher gain antenna structure to achieve acceptable signal-to-noise characteristics.

SUMMARY OF THE INVENTION

The present invention is a system and a method for effectively combining communications of the base stations of multiple wireless systems on the same antenna structure. In one embodiment, the present invention is a wireless system combiner which serves as an interface between base stations of first and second wireless systems ("first base station" and "second base station") and a shared antenna to substantially eliminate spurious noise from the first base station at frequencies allocated to the second base station and further to prevent transmit power from the first base station from feeding into the reception circuitry of the second base station in a shared antenna configuration.

The combiner according to one implementation of the present invention includes a first combiner filter connected between a duplexer of the first base station and a common connection point and a second combiner filter connected between a duplexer of the second base station and the common connection point. The first combiner filter in this implementation filters out spurious noise generated by first base station transmitter at frequencies outside the frequency band allocated to the first base station, for example using a high Q value band-pass or band-reject filter. The second combiner filter in this implementation filters out signal power at frequencies outside the second base station receive band to prevent transmit signal power of the first base station from feeding into the second base station's receiver circuitry, thereby preventing intermodulation.

The first and second combiner filters may be implemented as discrete elements from the circuitry of each base station, thereby allowing service providers of each wireless system to design their base station, and in particular base station transmit amplifier and filtering circuitry, without regard to whether the base station will be implemented in a shared antenna environment. Alternatively, the first and second combiner filters may be incorporated in the filtering circuitry of the first and second base stations respectively.

Still further, the first and second combiner filters according to embodiments of the present invention significantly decrease insertion loss (i.e., the power loss resulting when the transmission lines for each base station are connected at a common point between the antenna structure and the individual base stations) by creating very high impedance in the first base station side of the shared antenna configuration for frequencies of the second base station, and vice versa. Insertion loss can be even further reduced by achieving an electrical length of the transmission line between the first/second combiner filter and the common connection point which is tuned to the frequencies allocated for the first/second base stations respectively. As such, transmit/receive signal power for each of the first base station and the second base station will not substantially be lost in the other base station side of the shared antenna configuration.

In one exemplary implementation, a base station of a CDMA (Code Division Multiple Access) system, e.g., operating in accordance with the IS-95 A/B CDMA standard, and a base transceiver station of a GSM (Global System for Mobile communication) system are connected to the same antenna structure via a combiner. Base stations for CDMA wireless systems are typically allocated a receive band of 825 MHz–835 MHz and a transmit band of 870 MHz–880 MHz (for "A-Band") while base stations of GSM wireless systems are typically allocated a receive band of 890 MHz–915 MHz and a transmit band of 935 MHz–960 MHz. Even after each base filters out frequencies which are not in their respective transmit and receive bands, spurious noise from the CDMA base station transmitter will exist at receive frequencies of the GSM base station (e.g., at 890 MHz) due to the performance of the CDMA base station's transmit amplifier and the roll-off characteristics of filters typically used by a CDMA base station. Furthermore, CDMA base station transmit power in the range of 870 MHz–880 MHz will directly feed into the GSM base station receiver in a shared antenna configuration if not addressed, thereby degrading GSM receive performance. First and second combiner filters according to the present invention address these drawbacks by substantially eliminating spurious noise from the CDMA base station at frequencies allocated to the GSM base station, and preventing transmit power from the CDMA base station from feeding into the reception circuitry of the GSM base station.

BRIEF DESCRIPTION OF THE DRAWINGS

Other aspects and advantages of the present invention will become apparent upon reading the following detailed description, and upon reference to the drawings in which.

DETAILED DESCRIPTION

The following detailed description relates to a system and a method for effectively combining communications for the base stations of multiple wireless systems on the same antenna structure. In one embodiment, the present invention is a wireless system combiner which substantially eliminates spurious noise from a first base station at frequencies allocated to a second base station, and prevents transmit power from the first base station from feeding into the reception circuitry of the second base station in a shared antenna configuration, thereby isolating the communications of each wireless system. Exemplary embodiments of the present invention will be described with reference to the Figures.

Figure 1:
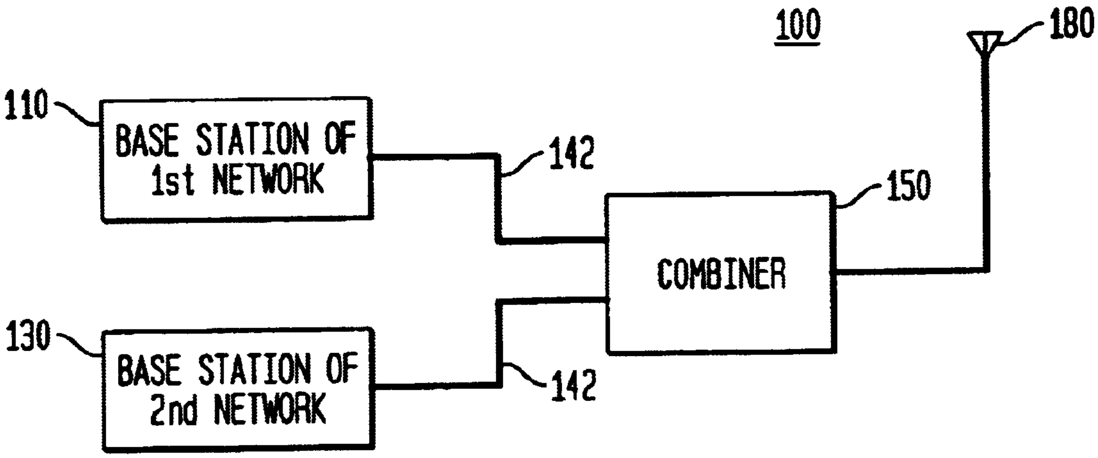
FIG. 1 is a general block diagram of shared antenna configuration according to an embodiment of the present invention.

In FIG. 1, there is shown a general block diagram illustrating a shared antenna configuration 100 according to an embodiment of the present invention. As shown in FIG. 1, the shared antenna configuration 100 includes a base station of a first wireless system 110 ("first base station 110") and a base station of a second wireless system 130 ("second base station 130") which are connected to an antenna 180 via a combiner 150. As discussed in detail below, the combiner isolates RF communications of the first base station 110 and the second base station 130.

Figure 2:
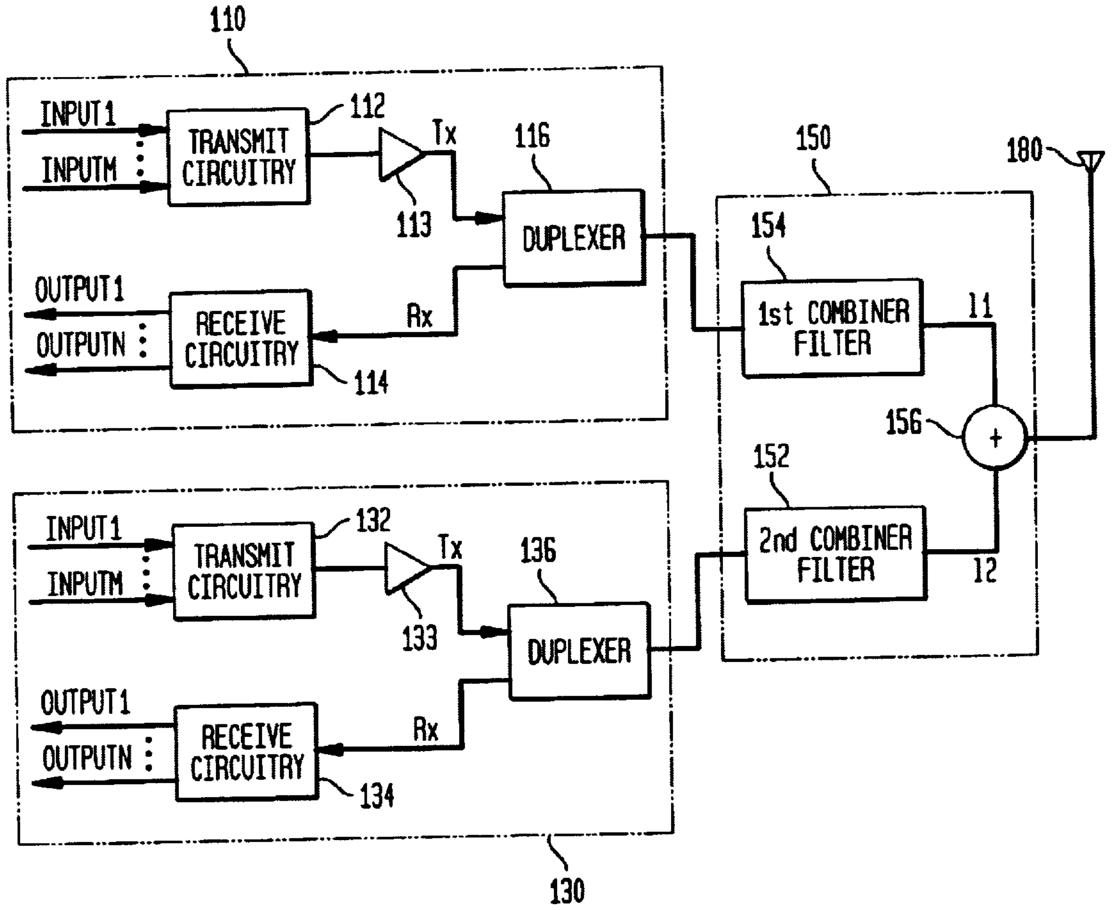
FIG. 2 is a block diagram illustrating select elements of first and second base stations and a combiner for the shared antenna configuration of FIG. 1 according to an embodiment of the present invention.

FIG. 2 illustrates select components of the first base station 110, the second base station 130, and the combiner 150 according to an embodiment of the present invention. As shown in FIG. 2, the first base station 110 includes transmit circuitry 112, a transmit amplifier 113, receive circuitry 114, and a duplexer 116. The transmit amplifier 113 and the receive circuitry 114 are each connected to the duplexer 116. The transmit circuitry 112 receives a plurality of communication inputs $Input_1, \ldots, Input_M$, for example voice traffic received from the Public Switched Telephone Network and/or data traffic received from a frame relay network, via a mobile switching center (not shown), and generates a modulated RF signal, for example using known baseband and RF processing techniques, which is amplified by the transmit amplifier 113 to create an amplified RF transmission signal Tx. The transmit amplifier 113 outputs Tx to the duplexer 116.

Transmit amplifiers typically must comply with performance specifications, e.g., as regulated by the FCC, to limit the amount of spurious noise output by the base station amplifier over a range of non-allocated frequencies, such as over a 30 kHz non-allocated band. For example, if the transmit power for the first base station is 20 Watts (i.e., 43 dBm), the performance specifications of the transmit amplifier may require a maximum of −60 dB for spurious noise emissions at frequencies just outside the base station's allocated transmit band (measured over a 30 kHz band).

The receive circuitry 114 receives an RF reception signal Rx from the duplexer 116 and recovers traffic/control information from Rx, for example using well known techniques, and outputs a plurality of traffic signals $Output_1, \ldots, Output_N$ to the mobile switching center (not shown). The second base station 130 similarly includes transmit circuitry 132, a transmit amplifier 133, receive circuitry 134, and a duplexer 136, and operates in a manner discussed above regarding the first base station 110.

The combiner 150 includes a first combiner filter 154 which is connected between the duplexer 116 of the first base station 110 and a common connection point 156, and a second combiner filter 152 which is connected between the duplexer 136 of the second base station 130 and the common connection point 156. The common connection point 156 is connected to the antenna 180. The operation of the first combiner filter 154 and the second combiner filter 152 will be discussed in detail below.

Figure 3A:
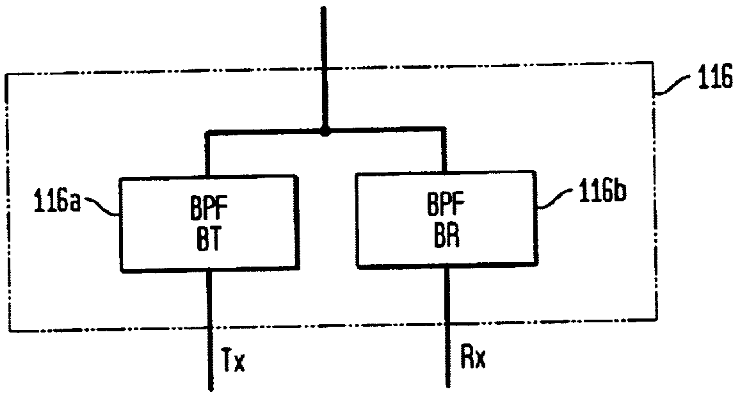
FIG. 3A illustrates an exemplary duplexer configuration suitable for use in accordance with principles of the present invention.

FIG. 3A illustrates a typical duplexer configuration which is suitable for implementing the duplexer 116 of the first base station 110 and the duplexer 136 of the second base station 130. As illustrated in FIG. 3A, the duplexer 116 includes a base station transmit band pass filter (BPF BT) 116*a* which receives Tx from the transmit amplifier 113, filters out frequencies in Tx which are above and below the base station transmit band boundaries, and outputs the result to the first combiner filter 154 of the combiner 150. The duplexer 116 further includes a base station receive band pass filter (BPF BR) 116*b* which receives RF signals from the first combiner filter 154 of the combiner 150, filters out frequencies above and below the base station receive band boundaries, and outputs the resulting signal Rx to the receive circuitry 114. The duplexer 136 of the second base station 130 may likewise have the configuration shown in FIG. 3A but will have different pass-bands for BPF BT and BPF BR.

Figure 3B:
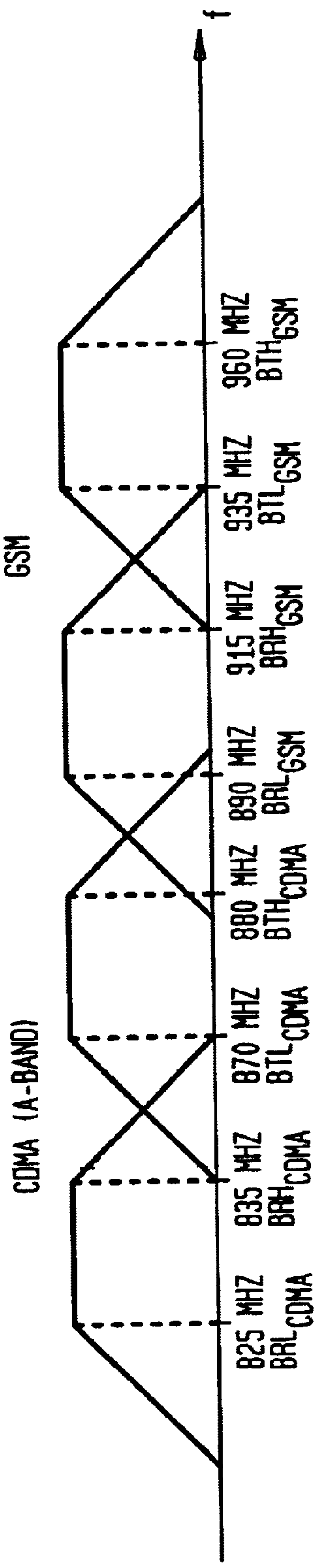
FIG. 3B illustrates exemplary base station transmit and receive bands for different wireless systems.

FIG. 3B illustrates exemplary band pass filtering effects of the duplexer 116 of the first base station 110 and the duplexer 136 of the second base station 130. The example of FIG. 3B assumes for illustration purposes that the first base station 110 belongs to a CDMA wireless system allocated a receive band of 825 MHz–835 MHz and a transmit band of 870 MHz–880 MHz ("A-Band"), and that the second base station 130 belongs to a GSM wireless system allocated a receive band of 890 MHz–915 MHz and a transmit band of 935 MHz–960 MHz. It should be recognized that the principles of the present invention are not solely applicable to a shared antenna configuration for CDMA and GSM base stations, which are instead specifically discussed for illustrative purposes.

In FIG. 3B, the lower and upper boundaries of the CDMA base station receive band are labeled $BRL_{CDMA}$ and $BRH_{CDMA}$ respectively, the lower and upper boundaries of the CDMA base station transmit band are labeled $BTL_{CDMA}$ and $BTH_{CDMA}$ respectively, the lower and upper boundaries to of the GSM base station receive band are labeled $BRL_{GSM}$ and $BRH_{GSM}$ respectively, and the lower and upper boundaries of the GSM base station transmit band are labeled $BTL_{CSM}$ and $BTH_{GSM}$ respectively. As seen from the example of FIG. 3B, the filters of the duplexer arrangement in a base station exhibit roll-off effects at frequencies which are just above and below the upper and lower band boundaries. Although such roll-off effects at the CDMA receive band and the GSM transmit band boundaries are not detrimental in this example, the proximity of $BTH_{CDMA}$ and $BRL_{RSM}$ will cause interference between the first and second base stations because of the performance of the first base station's transmit amplifier 113, which will create spurious noise at lower receive frequencies of the GSM base station, and the relatively gradual roll-off characteristics of the filtering performed by the duplexer 116 of the first base station 110 and the duplexer 136 of the second base station 130.

As applied to a configuration in which the first base station 110 is a CDMA base station and the second base station 130 is a GSM base station, the combiner 150 serves the following two purposes:(1) eliminating spurious noise from the first base station 110 at GSM receive frequencies (i.e., between 890 MHz to 915 MHz); and (2) preventing CDMA transmit power of the first base station 110 (i.e., between 870 MHz to 880 MHz) from feeding into the GSM receiver of the second base station 130 so as to prevent intermodulation between GSM receive signals and CDMA transmit signals.

For illustration purposes, it can be assumed that the transmit power of the first base station 110 is 20 W (i.e., 43 dBm), the performance specifications of the transmit amplifier 113 of the first base station require −60 dB/30 kHz (i.e., spurious noise measured over a 30 kHz band) at the frequency of 890 MHz, and the duplexer 116 of the first base station 110 achieves 76 dB of rejection at 890 MHz. Therefore, in accordance with these exemplary characteristics, the spurious noise from the first base station 110 at 890 MHz is −93 dBm/30 KHz (i.e., 43 dBm −60 dB −76 dB). If the first base station and the second base stations were to use separate antennas, such a level of spurious noise would be insignificant because the separate antennas would provide approximately 50 dB additional isolation. The inventors of this application have found, however, that the spurious noise from the first base station 110 will interfere with the second base station 130 in a CDMA/GSM shared antenna configuration unless otherwise addressed.

In an exemplary implementation of the present invention for the CDMA/GSM combining environment described above, the first combiner filter 154 is a band-pass filter characterized by a passband of 825 MHz–880 MHz and steep roll-off characteristics, e.g., a multi-section resonant filter having a Q value of approximately 2000 to provide approximately 40 dB additional attenuation at 890 MHz, thereby effectively preventing spurious noise from the duplexer 116 of the first base station 110 from interfering with receive frequencies of the second wireless system 130 (i.e., 890 MHz to 915 MHz). The first combiner filter 154 may also be a band-reject filter (or "notch" filter) which rejects possibly interfering frequencies, such as in the range of 890 MHz–915 MHz.

The inventors of this application have also found that, in a CDMA/GSM shared antenna configuration, transit power from the CDMA base station is likely to feed into the GSM base station's receive circuitry from the common connection point, thereby causing intermodulation with GSM receive signals which will affect receiver performance unless otherwise addressed. More specifically, assuming for illustrative purposes that CDMA transmit power at frequencies between 870 MHz–880 MHz should be below −50 dBm at the input of the receive circuitry 134 of the second base station 134, the nominal CDMA transmit power (at 870 MHz to 880 MHz) at the output of the transmit amplifier 113 of the first base station 110 is 43 dBm, and the duplexer 136 of the second base station 130 achieves 20 dB of rejection at 880 MHz, then an additional 73 dB of rejection is needed at 880 MHz to prevent intermodulation. In an exemplary implementation of the present invention for the CDMA/GSM combining environment described above, the second combiner filter 152 is implemented as a band-pass filter characterized by a passband of 890 MHz–960 MHz and steep roll-off characteristics, e.g., a multi-section resonant filter having a Q value of approximately 2000 to provide approximately 73 dB attenuation at 880 MHz. Like the first combiner filter 154, the second combiner filter 152 can be implemented as a band-reject filter which rejects possibly interfering frequencies, such as in the band of 870 MHz–880 MHz.

In addition to serving the above-described purposes of (1) eliminating spurious noise from the first base station 110 at receive frequencies of the second base station 130, and (2) preventing transmit power from the first base station from feeding into the receive circuitry 134 of the second base station 130, an advantage of the combiner 150 according to the present invention, when the combiner is implemented as a discrete element from the circuitry of the first base station 110 and the second base station 130, is that service providers do not have to modify base station circuit design, and in particular transmit amplifier and filtering circuitry, when the base station is implemented in a shared antenna environment. It should be recognized, however, that the first and second combiner filters may be realized by modifying the filtering circuitry of the first base station 110 and the second base station 130 to achieve the functions described above.

As an additional advantage, the combiner structure according to embodiments of the present invention significantly decreases insertion loss (i.e., the power loss resulting when the transmission lines for each base station are connected at a common point between the individual base stations and the antenna structure). More specifically, for the exemplary implementation shown in FIG. 2 in which the first combiner filter 154 is connected to the duplexer 116 of the first base station 110 and the second combiner filter 152 is connected to the duplexer 136 of the second base station 136, the impedance looking into second base station side of the shared antenna configuration from the common connection point 156 is very high for transmit (and receive) frequencies of the first base station 110 due to the presence of the second combiner filter 152. If the transmit signal (and receive signal) of the first base station 110 sees such high impedance looking into the second base station side 130 of the shared antenna configuration from the common connection point 156, the transmit signal (and receive signal) of the first base station 110 will enter/be received from the antenna 180 with very low loss.

Likewise, the impedance looking into first base station 110 side of the shared antenna configuration from the common connection point 156 is very high for receive (and transmit) frequencies of the second base station 130 due to the presence of the first combiner filter 154. If the receive signal (and transmit signal) of the second base station 130 sees such high impedance looking into the first base station 110 side of the shared antenna configuration from the common connection point 156, the receive signal (and the transmit signal) of the first second base station 110 will enter/be received from the antenna 180 with very low loss.

Insertion loss can be further reduced by implementing a tuned transmission configuration as discussed below. As illustrated in FIG. 2, the first combiner filter 154 is connected to the common connection point 156 via a transmission line l1, e.g., a coaxial cable, and the second combiner filter 152 is connected to the common connection point 156 via a transmission line 12. The impedance looking from the common connection point 156 into the path of l1, $Z_{in}$(l1), can be expressed as:

$$Z_{in}\,(l1) = -j\,Z_0\,\cot(BL1) \quad (1)$$

where $Z_0$ is characteristic impedance of the transmission line, e.g., approximately 50 Ω for coaxial cable, L1 is the length for the transmission line l1, and B is wave number (i.e., 2Π/λ, and thus frequency dependent). Equation (1) is derived by recognizing that $Z_{in}$ (l1) can be expressed as:

$$Z_{in}(l1) = Z_o \cdot \frac{(Z_{load}\cos(BL1) + jZ_o\mathrm{Sin}(BL1))}{Z_o\cos(BL1) + jZ_{load}\mathrm{Sin}(BL1))} \quad (2)$$

In equation (2), $Z_{load}$ can be represented by the impedance of the first combiner filter 154. Because $Z_{load}$ is extremely high at the frequencies allocated to the second base station relative to $Z_0$, the $Z_0$ terms in the numerator and denominator of Equation (2) can be disregarded, leaving:

$$Z_{in}(l1) \approx Z_o \cdot \frac{Z_{load}\cos(BL1)}{jZ_{load}\mathrm{Sin}(BL1)} \quad (3)$$

Equation (3) is merely a different expression of Equation (1), and shows that $Z_{in}$ (l1) will be maximized when BL1 , "electrical length," is approximately equal to 180°. For l1, λ may be represented as the wavelength at approximately the center frequency of the pass-band for the first combiner filter 154 (e.g., 850 MHz for the CDMA/GSM example described above).

Therefore, a length L1 for transmission line l1 may be selected which results in an electrical length of approximately 180° for a nominal frequency of 850 MHz to further reduce insertion loss (i.e., achieving a tuned transmission configuration).

These same principles apply to 12, such that $Z_{in}$(l2) will be maximized for frequencies allocated to first base station 110 when the electrical length for l2 is approximately equal 180°. For l2, A may be represented as the wavelength at approximately the center frequency of the pass band of the second combiner filter 152 (e.g., 935 MHz for the CDMA/GSM example described above).

Figure 4:
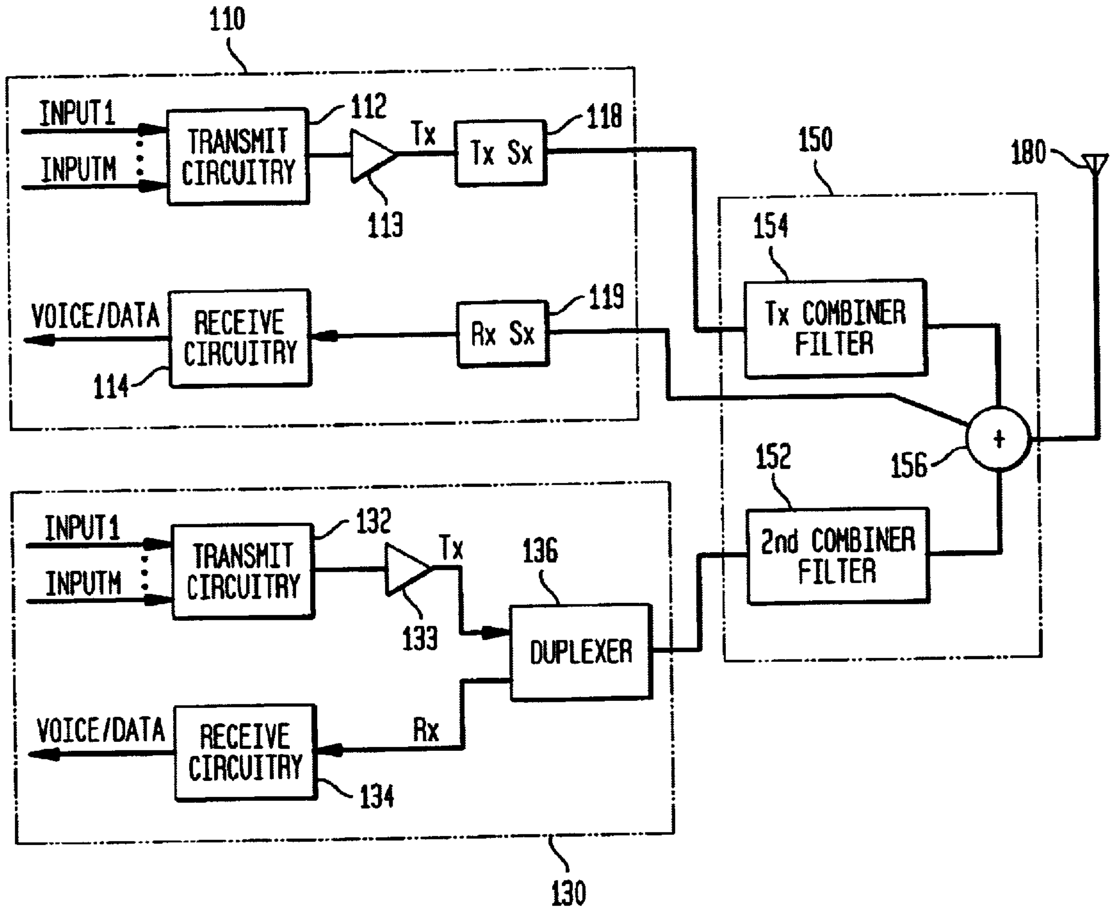
FIG. 4 is block diagram illustrating an alternative arrangement to the embodiment illustrated in FIG. 2.

FIG. 4 illustrates an alternative arrangement to the embodiment illustrated in FIG. 2. As shown in FIG. 4, the first base station 110 of this alternative embodiment includes a pair of simplexers, transmit simplexer 118 and receive simplexer 119, instead of a duplexer for filtering out frequency components which are not in the base station transmit and base station receive bands respectively. Accordingly, the first combiner filter 154 in this alternative embodiment includes a transmit combiner filter 154*a* which removes spurious noise resulting from the transmission path of the first base station 110. For the combined CDMA/GSM example discussed above, the transmit combiner filter 154*a* may be a band-pass filter having a pass band of 870 MHz–880 MHz to provide approximately 40 dB additional attenuation at 890 MHz. The transmit combiner filter 154*a* may also be realized as a band-reject filter, which for the CDMA/GSM combining example described above rejects frequencies between 890 MHz and 915 MHz. Although the second base station 130 and the second combiner filter 152 in the alternative embodiment illustrated in FIG. 4 are the same as FIG. 2, the second base station 130 may likewise be implemented using paired simplexers instead of duplexer 136. Still further, although the transmit combiner filter 154*a* and the second combiner filter 152 illustrated in FIG. 4 are shown as separate elements from the filtering circuitry of the first base station 110 and the second base station 130, it should be realized that the transmit simplexer 118 of the first base station 110 and the duplexer 136 of the second base station 130 may be modified to achieve the results discussed above.

It should be apparent to this skill in the art that various modifications and applications of this invention are contemplated which may be realized without departing from the spirit and scope of the present invention.

What is claimed is:

1. A combiner for connecting a first base station, associated with a first wireless system, and a second base station, associated with a second wireless system, to a shared antenna structure, comprising:

a first combiner filter connected to a duplexer of said first base station for reducing spurious noise from said first base at frequencies allocated to said second base station; and a second combiner filter connected to a duplexer of said second base station for preventing transmit signal power from said first base station from feeding into a reception path of said second base station via a common connection point for the shared antenna.

2. The combiner according to claim 1, wherein at least one of said first combiner filter and said second combiner filter is a band-pass filter.

3. The combiner according to claim 1, wherein at least one of said first combiner filter and said second combiner filter is a band-reject filter.

4. The combiner according to claim 1, wherein said first combiner filter includes a transmit filter connected to a transmit simplexer of said first base station.

5. The combiner according to claim 1, wherein said first wireless system is a Code Division Multiple Access (CDMA) system and said second wireless system is a Global System for Mobile communication (GSM) system.

6. The combiner according to claim 5, wherein said first base station is allocated a transmit band of 870 MHz–880 MHz and said second base station is allocated a receive band of 890 MHz–915 MHz.

7. The combiner according to claim 1, wherein a transmission line between said first combiner filter and said common connection point has an electrical length which minimizes insertion loss.

8. The combiner according to claim 1, wherein a transmission line between said second combiner filter and said common connection point has an electrical length which minimizes insertion loss.

9. The combiner according to claim 1, wherein said combiner is separate from filtering circuitry of said first base station and said second base station.

10. A method of connecting a first base station, associated with a first wireless system, and a second base station, associated with a second wireless system, to a shared antenna structure, said method utilizing a combiner to interface between circuitry of each of the first base station and the second base station and a common connection point for the shared antenna structure to isolate communications for the first base station and the second base station, comprising:

filtering frequencies outside a bandwidth allocated to the first base station to reduce spurious noise from the first base at frequencies allocated to the second base station; and filtering frequencies outside a bandwidth allocated to the second base station to prevent transmit signal power from the first station from feeding into a reception path of the second base station via the common connection point.

11. The method according to claim 10, wherein the first wireless system is a Code Division Multiple Access (CDMA) system and the second wireless system is a Global System for Mobile communication (GSM) system.

12. The method according to claim 11, wherein the first base station is allocated a transmit band of 870 MHz–880 MHz and the second base station is allocated a receive band of 890 MHz–915 MHz.

* * * * *